United States Patent
Hilla et al.

(10) Patent No.: US 6,343,345 B1
(45) Date of Patent: *Jan. 29, 2002

(54) CACHE BLOCKING OF SPECIFIC DATA TO SECONDARY CACHE WITH A FIRST AND A SECOND OR CIRCUIT

(75) Inventors: Stephen C. Hilla, Raleigh; Jonathan Rosen, Chapel Hill, both of NC (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/615,235

(22) Filed: Jul. 13, 2000

Related U.S. Application Data (63) Continuation of application No. 08/852,229, filed on May 6, 1997, now Pat. No. 6,094,708.

(51) Int. Cl.$^7$ .......................... G06F 12/00; G06F 13/00
(52) U.S. Cl. ....................... 711/138; 711/139; 711/122; 711/163; 711/203; 711/206; 711/144; 711/145
(58) Field of Search ................................. 711/138, 139, 711/122, 163, 203, 206, 207, 202–210, 144, 145; 709/203, 200, 216, 226, 229, 215; 370/428

(56) References Cited

U.S. PATENT DOCUMENTS

| | | | |
|---|---|---|---|
| 4,821,265 A | 4/1989 | Albal et al. | 370/110.1 |
| 4,864,559 A | 9/1989 | Perlman | 370/60 |
| 4,893,302 A | 1/1990 | Hemmady et al. | 370/60 |

(List continued on next page.)

OTHER PUBLICATIONS

Intel 82434LX/82434NX PCI, Cache and Memory Controller (PCMC), Dec. 1994, pp. 60–104.
Virtual LANs, Catalyst 2820 Series and Catalyst 1900 Series Enterprise Edition Software Configuration Guide, Chapter 2, pp. 2-1—2-49.
Deering, S. et al., "An Architecture for Wide–Area Multicaste Routing," Proceedings of SIGCOMM '94 Conf., ACM, pp. 126–135 (Oct. 1994).
IEEE, "IEEE Standards for Local and Metropolitan Area Networks: Virtual Bridged Local Area Networks," IEEE Std. 802.1Q–1998, Copyright 1999, pp. 1–199.
"Cisco VLAN Roadmap", http://www.cisco.com/warp/public/538/7.html, pp. 1–11, posted Jul. 17, 1995.
"Virtual Networking Services," http://www.cisco.com/warp/public/614/5.html, pp 1–12, posted Oct. 28, 1997.
"Cisco LAN Switching Products," http://www.cisco.com/warp/public/534/16.html, pp 1–24, posted Mar. 31, 1995.
"Multicast Routing," http://www.cisco.com/warp/public/614/17.html, pp 1–4, posted Aug. 3, 1995.
"IP Multicast Streamlines Delivery of Multicast Applications," http://www.cisco.com/warp/public/674/4.html, pp 1–4, posted Feb. 24, 1998.

(List continued on next page.)

*Primary Examiner*—Hong Kim
(74) *Attorney, Agent, or Firm*—Cesari and McKenna, LLP (57) ABSTRACT

A cache blocking mechanism ensures that transient data is not stored in a secondary cache of a router by managing a designated set of buffers in a main memory of the router. The mechanism defines a window of virtual addresses that map to predetermined physical memory addresses associated with the set of buffers; in the illustrative embodiment, only transient data may be stored in these buffers. The mechanism further blocks write requests directed to these predetermined memory buffers from propagating to the secondary cache, thereby precluding storage of transient data in the cache.

10 Claims, 5 Drawing Sheets

U.S. PATENT DOCUMENTS

| | | | |
|---|---|---|---|
| 4,933,937 A | 6/1990 | Konishi | 370/85.13 |
| 4,942,518 A | 7/1990 | Weatherford et al. | 364/200 |
| 5,018,137 A | 5/1991 | Backes et al. | 370/85.13 |
| 5,027,350 A | 6/1991 | Marshall | 370/85.13 |
| 5,088,032 A | 2/1992 | Bosack | 395/200 |
| 5,138,615 A | 8/1992 | Lamport et al. | 370/94.3 |
| 5,140,585 A | 8/1992 | Tomikawa | 370/60.1 |
| 5,157,774 A | 10/1992 | Culley | 395/425 |
| 5,210,850 A | 5/1993 | Kelly et al. | 395/425 |
| 5,247,639 A | 9/1993 | Yamahata | 395/425 |
| 5,247,642 A | 9/1993 | Kadlec et al. | 395/425 |
| 5,247,648 A | 9/1993 | Watkins et al. | 395/425 |
| 5,257,359 A | 10/1993 | Blasco et al. | 395/425 |
| 5,274,631 A | 12/1993 | Bhardwaj | 370/60 |
| 5,304,992 A | 4/1994 | Harashima | 340/825.52 |
| 5,305,311 A | 4/1994 | Lyles | 370/60 |
| 5,313,454 A | 5/1994 | Bustini et al. | 370/13 |
| 5,327,545 A | 7/1994 | Begun et al. | 395/425 |
| 5,361,256 A | 11/1994 | Doeringer et al. | 370/60 |
| 5,394,394 A | 2/1995 | Crowther et al. | 370/60 |
| 5,414,704 A | 5/1995 | Spinney | 370/60 |
| 5,418,779 A | 5/1995 | Yemini et al. | 370/54 |
| 5,420,862 A | 5/1995 | Perlman | 370/85.13 |
| 5,430,715 A | 7/1995 | Corbalis et al. | 370/54 |
| 5,454,093 A * | 9/1995 | Abdulhafiz et al. | 711/133 |
| 5,473,607 A | 12/1995 | Hausman et al. | 370/85.13 |
| 5,500,860 A | 3/1996 | Perlman et al. | 370/85.13 |
| 5,511,168 A | 4/1996 | Perlman et al. | 395/200.15 |
| 5,548,585 A | 8/1996 | Lagoutte et al. | 370/60 |
| 5,586,296 A | 12/1996 | Bernstein et al. | 395/465 |
| 5,612,959 A | 3/1997 | Takase et al. | 370/390 |
| 5,617,421 A | 4/1997 | Chin et al. | 370/402 |
| 5,623,627 A | 4/1997 | Witt | 395/499 |
| 5,625,793 A | 4/1997 | Mirza | 395/465 |
| 5,633,858 A | 5/1997 | Chang et al. | 370/255 |
| 5,673,263 A | 9/1997 | Basso et al. | 370/396 |
| 5,684,800 A | 11/1997 | Dobbins et al. | 370/401 |
| 5,740,171 A | 4/1998 | Mazzola et al. | 370/392 |
| 5,742,604 A | 4/1998 | Edsall et al. | 370/401 |
| 5,752,003 A | 5/1998 | Hart | 395/500 |
| 5,752,274 A | 5/1998 | Garibay, Jr. et al. | 711/206 |
| 5,754,547 A | 5/1998 | Nakazawa | 370/401 |
| 5,764,636 A | 6/1998 | Edsall | 370/401 |
| 5,778,422 A | 7/1998 | Genduso et al. | 711/117 |
| 5,796,732 A | 8/1998 | Mazzola et al. | 370/362 |
| 5,796,740 A | 8/1998 | Perlman et al. | 370/401 |
| 5,829,027 A | 10/1998 | Goodrum | 711/122 |
| 5,835,720 A | 11/1998 | Nelson et al. | 395/200.54 |
| 5,875,464 A | 2/1999 | Kirk | 711/129 |
| 5,890,216 A | 3/1999 | Derrick et al. | 711/138 |
| 5,906,001 A | 5/1999 | Wu et al. | 711/154 |
| 5,910,955 A | 6/1999 | Nishimura et al. | 370/401 |
| 5,968,126 A | 10/1999 | Ekstrom et al. | 709/225 |
| 5,982,773 A | 11/1999 | Nishimura et al. | 370/395 |
| 5,999,536 A | 12/1999 | Kawafuji et al. | 370/401 |

OTHER PUBLICATIONS

"Cisco IOS VLAN Services," http://www.cisco.com/warp/public/614/11.html, pp 1–4, posted Jan. 21, 1998.

"Cisco IOS Technologies," http://www.cisco.com/warp/public/732/ciscoios.html, pp 1–2, 1997.

"The Virtual LAN Technology Report," decisys http://www.3com./com/nsc/200374.html, pp. 1–19, 1996.

"ATM Internetworking," http://www.cisco.com/warp/public/614/12.html, pp. 1–77, posted May, 1995.

ISL Functional Specification, web.http://www.cisco.com/warp/public/741/4.html, pp. 1–4.

Configuring VTP and Virtual LANs, Catalyst 5000 Series Software Configuration Guide (4.2), Chapter 13, pp. 1–24.

* cited by examiner

CACHE BLOCKING OF SPECIFIC DATA TO SECONDARY CACHE WITH A FIRST AND A SECOND OR CIRCUIT

CROSS-REFERENCE TO RELATED APPLICATION

This application is a continuation of U.S. patent application Ser. No. 08/852,229, filed May 6, 1997 now U.S. Pat. No. 6,094,708, entitled "Secondary Cache Write-Through Blocking Mechanism." The entirety of said application is hereby incorporated herein by reference.

FIELD OF THE INVENTION

This invention relates generally to computer networks and, more specifically, to the utilization of caches within intermediate nodes of a computer network.

BACKGROUND OF THE INVENTION

A computer network is a geographically distributed collection of interconnected subnetworks for transporting data between nodes, such as computers. A local area network (LAN) is an example of such a subnetwork; a plurality of LANs may be further interconnected by an intermediate node, called a router, to extend the effective "size" of the computer network and increase the number of communicating nodes. The nodes typically communicate by exchanging discrete frames or packets of data according to predefined protocols. In this context, a protocol consists of a set of rules defining how the nodes interact with each other.

Each node typically comprises a number of basic subsystems including a processor subsystem, a main memory subsystem and an input/output (I/O) subsystem. In particular, the main memory subsystem comprises storage locations typically composed of random access memory (RAM) devices which are addressable by the processor and I/O subsystems. In the case of a router, data such as non-transient data (i.e., instructions) and transient data (i.e., network data passing through the router) are generally stored in the addressable storage locations.

Data is transferred between the main memory and processor subsystems over a system bus that typically consists of control, address and data lines. The control lines carry control signals specifying the direction and type of transfer. For example, the processor issues a read request signal to transfer data over the bus from an addressed location in the main memory to the processor. The processor then processes the retrieved data in accordance with instructions obtained from the memory. The processor thereafter issues a write request signal to store the results in an addressed location in the main memory.

The data transferred between the processor and main memory subsystems must conform to certain timing relationships between the request signals and the data on the bus. Access time is defined as the time interval between the instant at which the main memory receives a request signal from the processor and the instant at which the data is available for use by the processor. If the processor operates at a fast rate and the access time of the main memory is slow as compared to the processor rate, the processor must enter a wait state until the request to memory is completed, thereby adversely affecting the processing rate of the processor. This problem is particularly significant when the memory request is a read request, since the processor is unable to operate, that is, process data, without the requested information.

A high-speed primary cache memory may be used to alleviate this situation. The primary cache is typically located on the processor and has an access speed that is closer to the operational speed of the processor; thus, use of the cache increases the speed of data processing by providing data to the processor at a rapid rate. The cache operates in accordance with the principle of locality; that is, if a memory location is addressed by the processor, it will probably be addressed again soon and nearby memory locations also will tend to be addressed soon. As a result, the cache is generally configured to temporarily store most-recently-used data. When the processor requires data, the cache is examined first. If the data is not located in the cache (a cache "miss"), the main memory is accessed. A block mode read request is then issued by the processor to transfer a block of data, including both the required data and data from nearby memory locations, from the main memory to the cache.

A primary cache is faster and more expensive to implement than main memory and, because of its higher cost, smaller. To supplement such an expensive primary cache, a secondary cache may be employed. The secondary cache does not operate as fast as the primary cache primarily because the secondary cache is typically coupled to a processor bus within the processor subsystem; operations occurring over the processor bus generally execute at a different (slower) clock speed than that of the primary cache internal to the processor. Yet, data accesses to secondary cache occur faster than those to main memory.

Typically, a random access main memory is logically organized as a matrix of storage locations, wherein the address of each location comprises a first set of bits identifying the row of the location and a second set of bits identifying the column. A cache memory, such as the primary or secondary cache, holds a number of blocks of data, with each block containing data from one or more contiguous main memory locations. Each block is identified by a cache address. The cache address includes memory address bits that identify the corresponding memory locations. These bits are collectively called the index field. In addition to data from main memory, each block also contains the remainder of the memory address bits identifying the specific location in main memory from which the data in the cache block was obtained. These latter bits are collectively called a tag field.

Each node, including the router, is functionally organized by an operating system comprising a collection of software modules that control the execution of computer programs and manage the transfer of data among its subsystems. The processor subsystem executes the programs by fetching and interpreting instructions and processing network data in accordance with the instructions. Program-generated addresses are called virtual addresses because they refer to the contiguous logical, i.e., virtual, address space referenced by the computer program. In contrast, the physical address space consists of the actual locations where data is stored in main memory. A computer with a virtual memory allows programs to address more memory than is physically available. The operating system manages the virtual memory so that the program operates as if it is loaded into contiguous physical locations. A common process for managing virtual memory is to divide the program and main memory into equal-sized blocks or pages so that each program page fits into a memory page. A system disk participates in the implementation of virtual memory by storing pages of the program not currently in memory. The loading of pages from the disk to host memory is managed by the operating system.

When a program references an address in virtual memory, the processor calculates the corresponding main memory physical address in order to access the data. The processor typically includes memory management hardware to hasten the translation of the virtual address to a physical address. Specifically, for each program there is a page table containing a list of mapping entries, i.e., page table entries (PTEs), which, in turn, contain the physical address of each page of the program. Each PTE also indicates whether the program page is in main memory. If not, the PTE specifies where to find a copy of the page on the disk. Because of its large size, the page table is generally stored in main memory; accordingly, an additional memory access is required to obtain the physical address, which increases the time to perform the address translation.

To reduce address translation time, another cache dedicated to address translations, called a translation-lookaside buffer (TLB), may be used. The TLB contains entries for storing translations of recently accessed virtual addresses. A TLB entry is similar to a cache entry in that the tag holds portions of the virtual address and the data portion holds a physical page-frame number. When used in conjunction with a cache, the TLB is accessed first with the program-generated virtual address before the resulting physical address is applied to the cache.

Accordingly when the processor requires data, the virtual address is passed to the TLB where it is translated into a physical address which is used to access the caches. Specifically, the index field and tag field in the primary cache are initially examined to determine whether a block contains the requested data. If the data is not present in the primary cache, the secondary cache is examined. The secondary cache is generally arranged such that when data is forced out of primary cache it is stored in the secondary cache. If that data is needed before a corresponding block is forced out of secondary cache, then the primary cache is filled from secondary cache instead of from main memory.

This arrangement works well for non-transient data that is likely to be referenced many times from primary cache over a non-contiguous period of time. However if the data is transient and unlikely to be referenced more than once, storage of the data in secondary cache provides no performance advantage. It is thus desirable to keep transient data out of secondary cache so that the cache can be used to hold data that is more persistent, such as processor instructions and frequently-accessed data structures.

Although larger than primary cache, the secondary cache is substantially smaller than main memory. If the working set of memory (i.e., the range of addresses accessed within a unit of time) is large, the primary/secondary cache system arrangement is inefficient because it constantly thrashes between different areas of main memory. To reduce thrashing, the working set of memory is kept to a minimum. Some thrashing may be acceptable for memory that is continually referenced, assuming that there is an opportunity to fill and re-fill primary cache from secondary cache prior to a corresponding cache block being forced out of secondary cache. If there is no chance of re-filling primary cache, thrashing negates the value of the secondary cache by producing a cluttering effect that prevents cache blocks which could be used to re-fill primary cache from being maintained in secondary cache.

In many cases transient data are not easily manageable. Such data may comprise scattered data structures that are not referenced often enough to take advantage of being re-filled from secondary cache. In addition to gaining no benefit from storage in secondary cache, transient data prevent other data structures from realizing any benefit due to cluttering of secondary cache. It would therefore be advantageous to identify those memory addresses holding transient data and to prevent those addresses from being stored in secondary cache.

SUMMARY OF THE INVENTION

The invention comprises a cache blocking mechanism for ensuring that transient data is not stored in a secondary cache of a router by managing a designated address range of buffers in a main memory of the router. In general, the mechanism defines a window of virtual addresses that map to predetermined physical memory addresses associated with a set of buffers; in the illustrative embodiment described herein, only transient data may be stored in these buffers. The mechanism further blocks write requests directed to these memory buffers from propagating to the secondary cache, thereby precluding storage of transient data in the cache. This, in turn, eliminates cluttering of that cache, thereby increasing the processing performance of the router.

Specifically, a translation-lookaside buffer (TLB) is configured to transform virtual addresses falling within the window into the predetermined physical addresses, each of which is characterized by assertion of a particular address bit. In the illustrative embodiment, the particular address bit is typically asserted by the TLB during a block-mode write transaction to the memory. Assertion of this address bit invokes write-blocking circuitry that effectively inhibits copying of the transient data stored at the corresponding physical address in memory to the secondary cache.

One advantage of the invention is that the elimination of transient data in the secondary cache, together with the principle of locality, increases the likelihood that relevant non-transient data may be present in the cache during access requests to memory, thereby providing a substantial performance enhancement over existing routers. In addition, the inventive mechanism is flexible in that the designation of the data stored in the buffer set may be easily converted from primary-only cached (i.e., secondary cache-blocked) to fully-cached to enable efficient management of the secondary cache.

BRIEF DESCRIPTION OF THE DRAWINGS

The above and further advantages of the invention may be better understood by referring to the following description in conjunction with the accompanying drawings in which like reference numbers indicate identical or functionally similar elements.

DETAILED DESCRIPTION OF ILLUSTRATIVE EMBODIMENT

Figure 1:
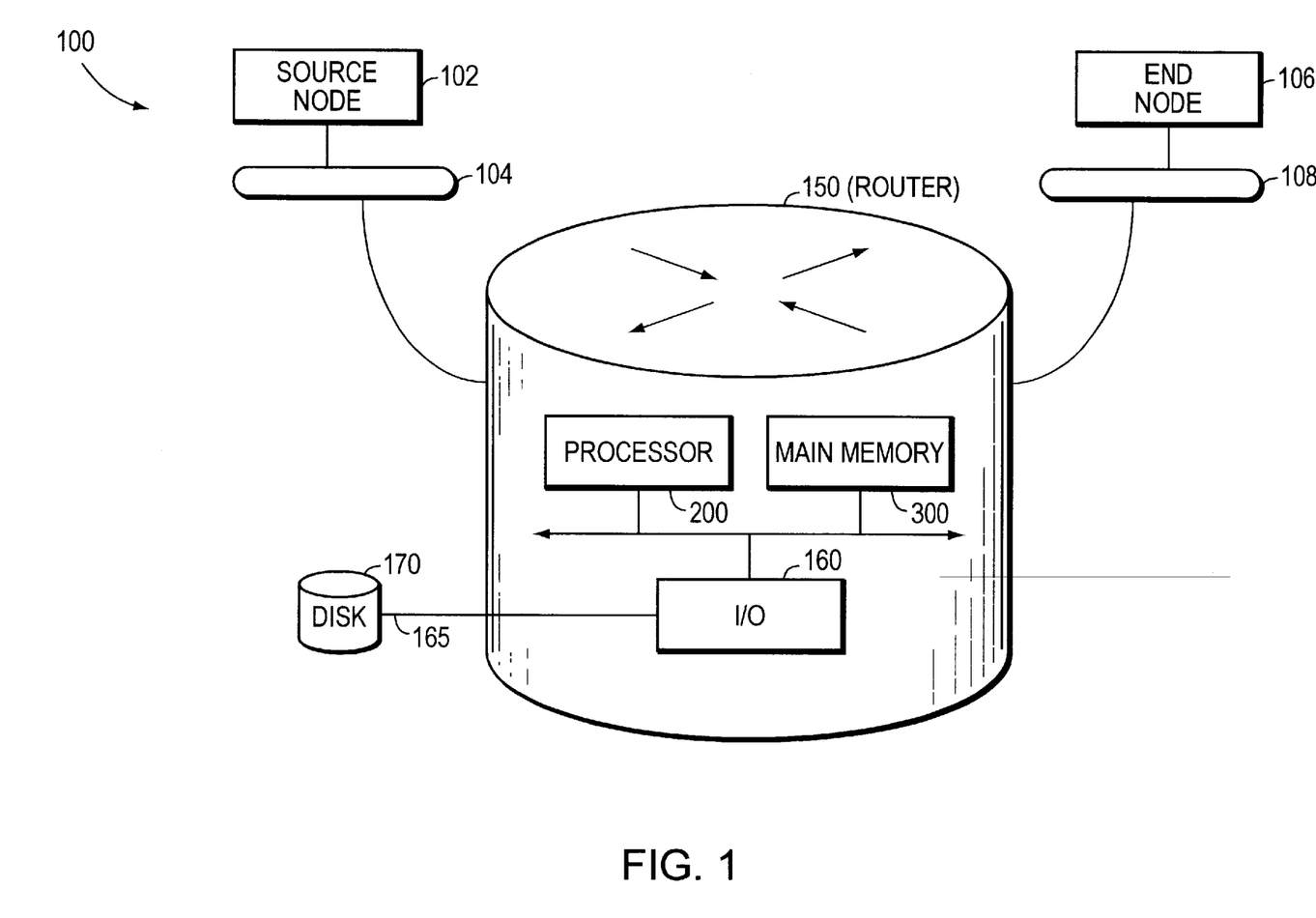
FIG. 1 is a block diagram of a computer network comprising a collection of interconnected subnetworks and nodes, including an intermediate node having processor and memory subsystems.

FIG. 1 is a block diagram of a computer network 100 comprising a collection of interconnected subnetworks and nodes. The nodes are typically computers comprising a source end node 102, a destination end node 106 and an intermediate node 150, the latter of which is preferably a router. The subnetworks 104, 108 included within network 100 are preferably local area networks (LANs) interconnected by the router 150, although the networks may comprise other communication links, such as wide area networks. Communication among the nodes coupled to the LANs is typically effected by exchanging discrete data packets among the nodes.

For example, the source node 102 generates a data packet by encapsulating "payload" (network) data within headers, such as a network layer header, as the data passes through different layers of a protocol stack. The packet is then transmitted over the network to the router 150 which facilitates the flow of the data packet through the network by routing it to the proper receiving node 106. Specifically, the router receives the packet from an input port, parses the network layer header and renders a forwarding decision for the packet, appends a new header to the packet and transmits the packet to an output port. Although it is temporarily stored during the decision making process, the network data is generally not processed by the router.

The router 150 typically comprises a plurality of interconnected subsystems including a processor subsystem 200, a main memory subsystem 300 and an input/output (I/O) subsystem 160. The I/O subsystem contains the input and output ports through which the router physically connects to the LAN or other interconnect, such as an I/O bus 165. The I/O bus, in turn, may be coupled to peripheral devices, such as a system disk 170, that may be used in the implementation of virtual memory in the router.

The memory subsystem 300 comprises storage locations addressable by the processor and I/O subsystems for storing software programs and data structures associated with the inventive cache blocking mechanism described herein. Data such as non-transient data (i.e., instructions) and transient data (i.e., network data passing through the router) are also generally stored in the addressable locations. As operating system, portions of which are typically resident in memory and executed by the processor, functionally organizes the router by, inter alia, invoking network operations in support of software processes executing on the router. It will be apparent to those skilled in the art that other memory means, including various computer readable media, may be used for storing and executing program instructions pertaining to the described mechanism and techniques.

Figure 2:
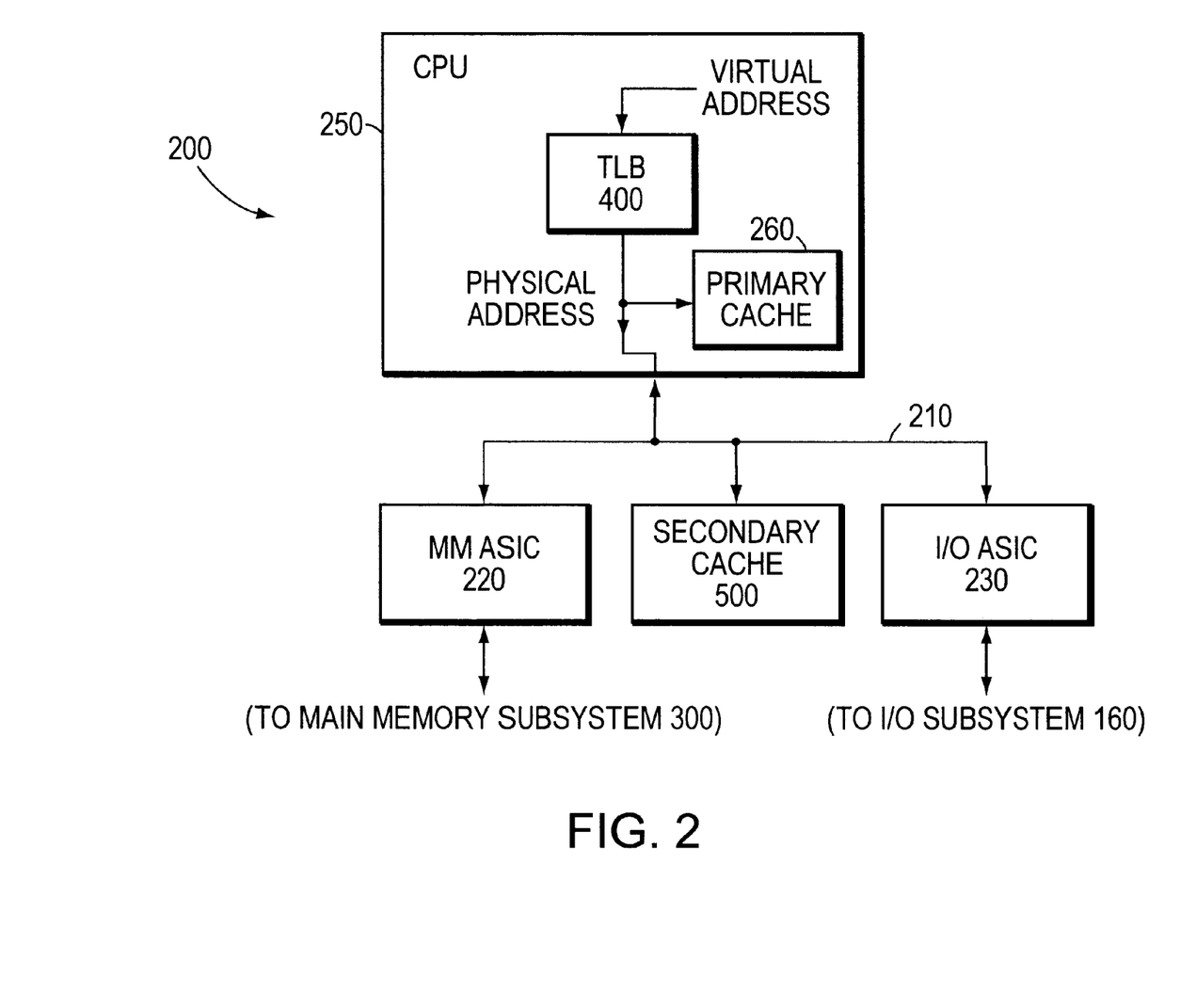
FIG. 2 is a block diagram of the processor subsystem of the intermediate node of FIG. 1.

FIG. 2 is a block diagram of the processor subsystem 200 comprising a processor bus 210 that interconnects a processor 250 with a secondary cache module 500 and data path circuitry preferably embodied as application specific integrated circuits (ASICs). The MM ASIC 220 provides a data path interface to main memory subsystem 300 and the I/O ASIC 230 provides a data path interface to the I/O subsystem 160; fundamentally, each ASIC operates to decode different ranges of addresses directed to its respective subsystem.

The processor 250 is a central processing unit (CPU) comprised of processing elements or logic for executing the software programs and manipulating the data structures and packets described herein. In the illustrative embodiment, the CPU is preferably a MIPs IDT 4700 processor, although it is understood that other processor architectures may be used within the teachings of the invention. The CPU also contains a primary cache memory 260 and a translation-lookaside buffer (TLB) 400. The TLB generally stores translations of program-generated virtual addresses to corresponding physical addresses needed to access data in main memory 300, primary cache 260 or secondary cache 500.

The secondary cache 500 is designed to reduce the number of address comparisons required to access the stored information, while also reducing the number of access requests to main memory when the requested data is not present in the cache. Accordingly, the secondary cache is preferably organized as a write-through, direct-mapped cache, although it will be apparent to those skilled in the art that other cache organizations, such as a set-associative cache, could be used within the teachings of the invention.

In general, data flows into the router 150 through an input port of the I/O subsystem 160 and is loaded directly into main memory 300 via direct memory access (DMA) operations. The CPU 250 then accesses the memory to retrieve the data, manipulate it and return it to memory where it is then forwarded to an output port for transmission over the network 100. Depending upon the format of the data and the processing required, the CPU may also access memory to retrieve instructions specifying how to process the data. In this case, the CPU 250 executes a block mode read transaction over the processor bus 210 to retrieve data from memory 300 and load it into its primary cache 260. In the illustrative embodiment, a cache line or block mode transaction is preferably a 32-byte "burst" read or write operation consisting of four back-to-back 8-byte memory accesses.

A function of the secondary cache 500 is to "snoop" data transactions occuring over the processor bus 210 and to store data of specific transactions that may be frequently-used by the CPU 250. For example in response to detecting a block mode transaction, the secondary cache stores the data associated with that transaction. Thereafter if the CPU issues a request to read that data from memory 300 because the data has been forced out of primary cache 260, the secondary cache 500 intervenes and satisfies that request in a timely and efficient manner.

A problem with this approach is that the secondary cache "blindly" stores all data, including transient data, associated with such block mode transactions. As noted, transient data is defined as network data that are typically only referenced once by the CPU. In order to re-use those locations storing transient data, the CPU 250 must first "flush" the corresponding address range of the cache 500 to ensure that its state is consistent with contents of memory 300. This is primarily because the I/O subsystem 160 moves data to and from memory (via DMA operations) without intervention from the CPU or caches. Execution of instructions to flush secondary cache lines are expensive in terms of time and resources, thereby reducing some of the performance gains provided by a secondary cache.

Moreover if allowed to fill the secondary cache, transient data would clutter that cache with entries that force other cache blocks (which could be used to re-fill primary cache) out of secondary cache. This also reduces the effectiveness of the secondary cache. It is therefore desirable to eliminate transient data from secondary cache so that the cache can be used to hold data that is more persistent, such as processor instructions and frequently-accessed data structures.

Figure 3:
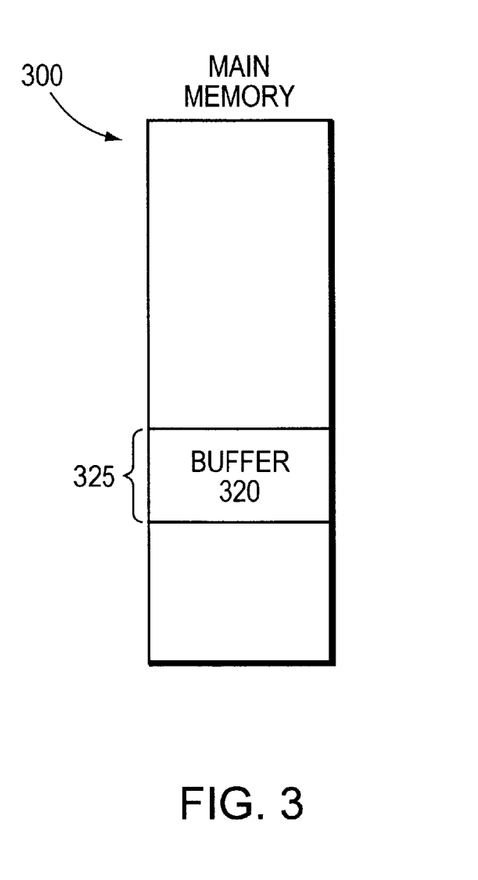
FIG. 3 is a schematic block diagram of the main memory subsystem having a set of buffers used in connection with the invention.

In accordance with the invention, a cache blocking mechanism is provided for ensuring that transient data is not stored in the secondary cache by managing a designated address range of buffers in the main memory subsystem of the router. FIG. 3 is a schematic block diagram of the organization of main memory 300 and a set of buffers 320 used in connection with the invention. The buffers 320 are allocated a range 325 of predetermined memory addresses and are managed to store selected data that is provided typically during the DMA operations. Although they are depicted as a contiguous region of memory 300, the buffers 320 may also be non-contiguous and managed through use of pointers.

Figure 4:
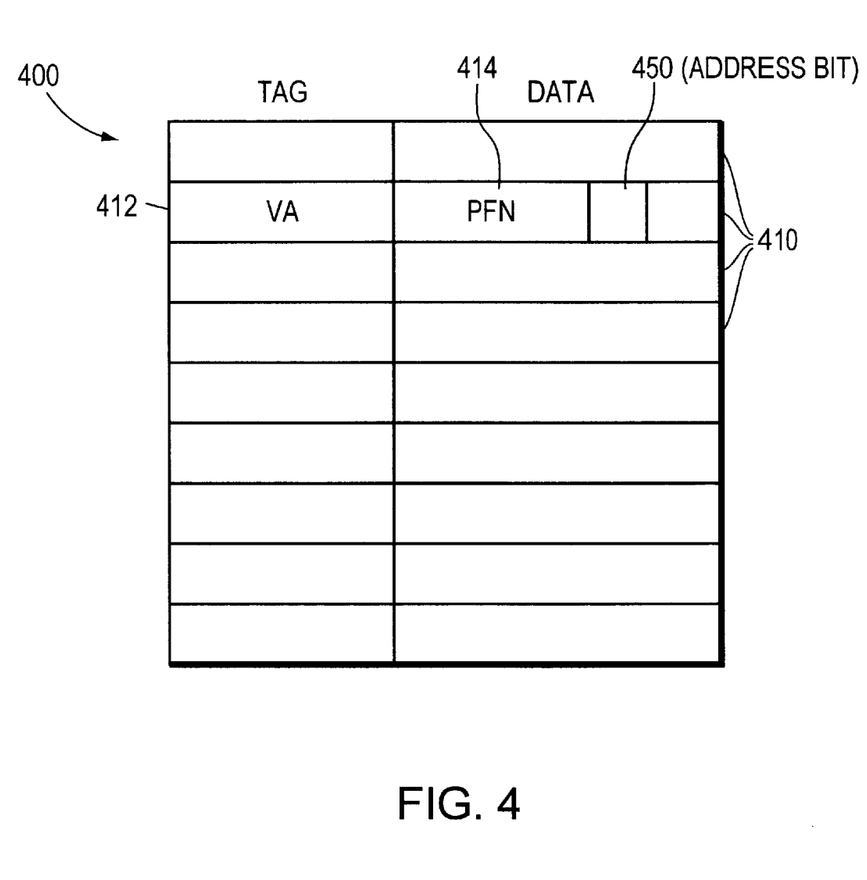
FIG. 4 is a block diagram of a translation lookaside buffer configured to operate with a cache blocking mechanism of the present invention.

As described in the illustrative embodiment set forth herein, the buffers 320 are reserved as an address range for storing only transient data which may not be copied to secondary cache 500. In another aspect of the invention, the cache blocking mechanism defines a window of virtual addresses that map to the predetermined physical memory addresses associated with the set of buffers. The TLB 400 is configured to transform these virtual addresses falling within the window into the predetermined physical addresses, each of which is characterized by assertion of a particular address bit. FIG. 4 is a block diagram of the TLB 400 configured to operate with the cache blocking mechanism of the present invention.

The TBL 400 contains entries 410 for storing translations of recently accessed virtual addresses. Each entry comprises a tag field 412 that holds portions of the virtual address (VA) and a data field 414 holds a physical page-frame number (PFN). According to the invention, the particular address bit 450 is contained within the field 414 and is asserted, e.g., set "high", during a block-mode write transaction directed to the memory buffers 320. That is, a virtual address generated by the CPU 250 and directed to buffer 320 storing transient data is mapped to a physical address having the bit 450 asserted; as described herein, assertion of this address bit invokes write-blocking circuitry that effectively blocks transfer of the transient data stored at the corresponding physical address in memory to the secondary cache 500.

In the illustrative embodiment, the address bit 450 is preferably a high-order address bit, such as address bit <33>, because the CPU 250 does not generally use such a high-order bit during block mode transactions to main memory 300. Yet when address bit 450 is asserted during a block mode transaction over the processor bus 210, the cache blocking mechanism is configured to block the data associated with the transaction from being copied to the secondary cache, thereby precluding storage of transient data in the cache.

Figure 5:
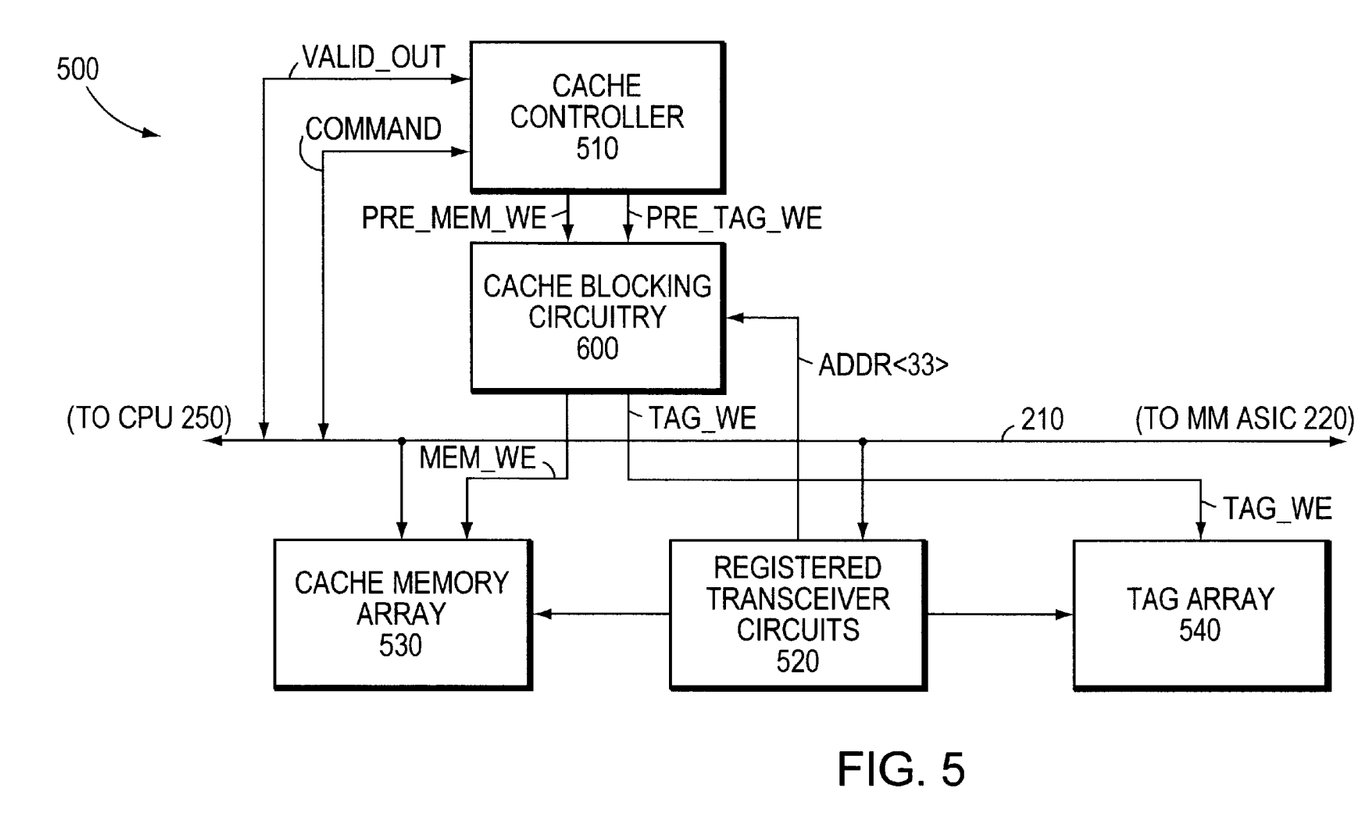
FIG. 5 is a block diagram of a secondary cache module of the processor subsystem of FIG. 2.

Specifically, the assertion of the cache blocking signal disables certain circuits of secondary cache module 500 so that the circuits are not presented with the block mode instruction cycle. FIG. 5 is a block diagram of the secondary cache module 500 comprising a cache controller 510, registered transceiver circuits 520, a secondary cache memory 530, a tag array 540 and the cache blocking circuitry 600. The controller (e.g., Galileo GT64012), transceivers (e.g., 74FCT162501), cache memory array (e.g., 64K×64 static RAM) and tag array (e.g., static RAM) are commercially available devices, whereas the circuitry 600 is preferably customized and embodied within a programmable array logic (PAL) device.

Operationally, the CPU generates a control signal, called valid_out, that is received by the controller 510 and indicates the start of a bus transaction request cycle. In response to the valid_out signal, the controller decodes the address of the transaction request on a command portion of the processor bus 210. The command bits of the request specify the type of transaction (e.g., block, non-block, flush, reset) and type of access (read, write). If the request is a block-mode write transaction, the controller issues pre-write enable (pre_mem_we, pre_tag_we) signals to the circuitry 600 that are typically used to activate write operations to the tag and cache memory arrays.

Upon receiving these pre_xxx_we signals, the circuitry 600 decodes the address bit 450 to determine if it is asserted; if so, the circuitry blocks write (mem_we, tag_we) signals to the tag and cache memory arrays to effectively suppress write operations to those arrays. The tag array 540 contains the address associated with the cache block in the cache memory and the actual data in the block is stored in the cache memory array 530.

Figure 6:
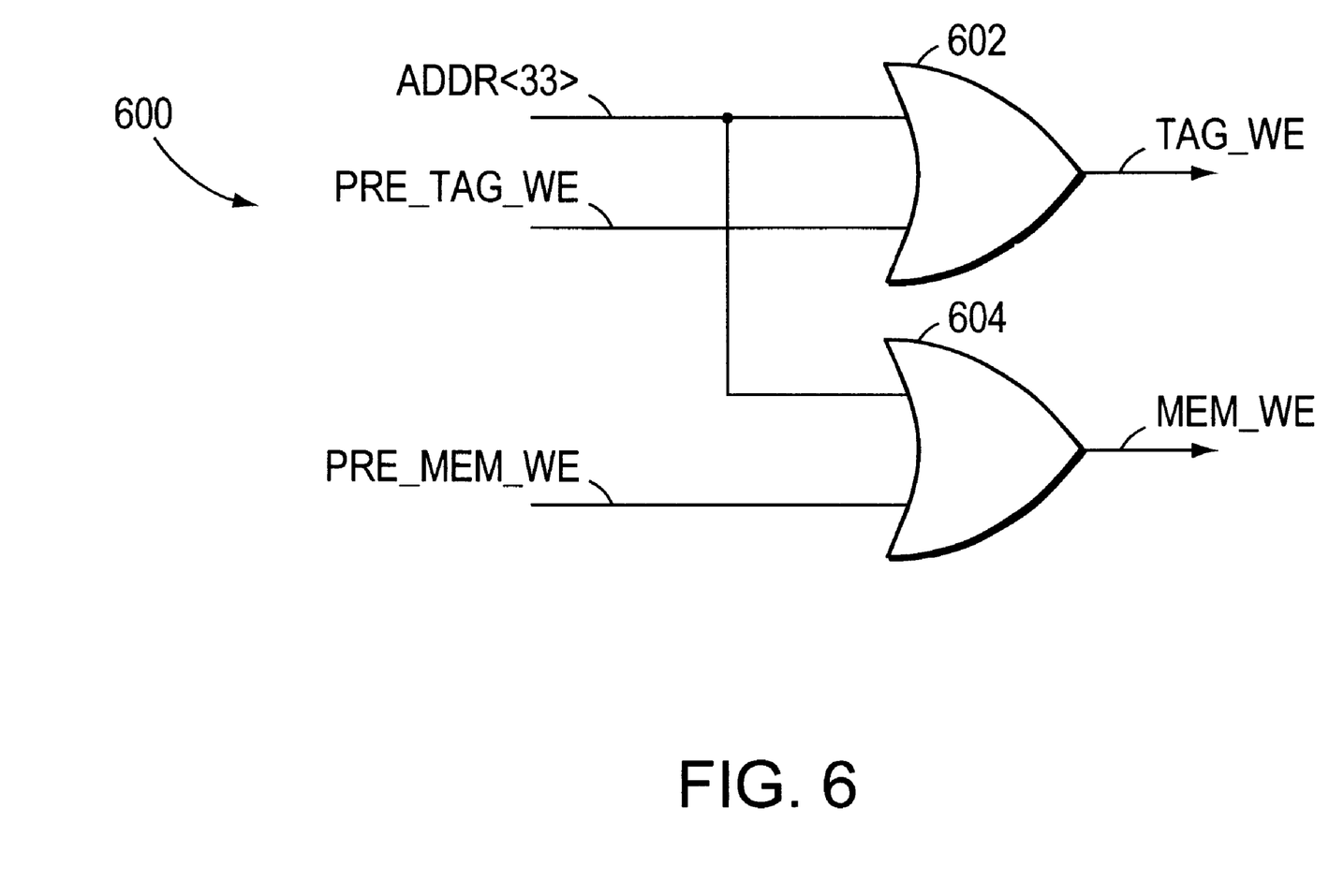
FIG. 6 is a block diagram of the cache blocking circuit of the mechanism in accordance with the present invention.

FIG. 6 is a block diagram of the cache blocking circuitry 600 of the mechanism in accordance with the present invention. The cache blocking circuitry 600 comprises a plurality of OR gates 602, 604 coupled to a plurality of input signals. Specifically, the addr<33> signal, i.e., the particular address bit 450, is preferably latched from the processor bus 210 by the registered transceivers 520 during the address phase of the bus cycle. That signal is then fed, along with the pre_tag_we signal, i.e., the tag array write enable signal, to the inputs of OR gate 602, while signals addr<33> and pre_mem_we, i.e., the cache memory array write enable signal, are fed to the inputs of OR gate 604.

When addr<33> is asserted, the output signals of OR gates 602, 604, i.e., tag_we, mem_we, are also asserted and fed to the tag and cache memory arrays to effectively block write operations to those arrays during the data phase of the transaction. By blocking write accesses to specific locations of the tag array, a cache "hit" cannot occur later when a read access is attempted to one of those locations in the cache. To ensure that the write operations are blocked from copying the data to the arrays, the output signals of the OR gates must be maintained in asserted states for duration of the data phase. It is for this reason that the signal addr<33> is preferably retrieved from the registered transceivers 520; signals latched by the transceivers are maintained until the address phase of a next instruction cycle is issued from the CPU.

In summary, the invention provides a mechanism for precluding certain data from being copied into the secondary cache. To ensure proper and efficient operation of the inventive mechanism, there should be no altering of the type of data blocked from the cache. For example, if transient data is precluded from the cache during a transaction pertaining to a particular packet, non-transient data may not be precluded for the next packet. Otherwise, special operations may be needed to flush the secondary cache, which results in inefficient use of the CPU.

Moreover, elimination of a certain type of data, e.g., transient data, from the secondary cache, together with the principle of locality, increases the likelihood that relevant non-transient data may be present in the cache during access requests to memory, thereby providing a substantial performance enhancement over existing routers. In addition, the inventive mechanism is flexible in that the designation of the data stored in the buffer set may be easily converted from primary-only cached (i.e., secondary cache-blocked) to fully-cached to enable efficient management of the secondary cache.

The foregoing description has been directed to specific embodiments of this invention. It will be apparent, however, that other variations and modifications may be made to the described embodiments, with the attainment of some or all of their advantages. Therefore, it is the object of the appended claims to cover all such variations and modifications as come within the true spirit and scope of the invention.

What is claimed is:

1. A cache blocking mechanism that inhibits copying of specific data to a secondary cache means for storing during a write request executed by a processor means and directed to a main memory means for storing of a network device, the mechanism comprising:

means for buffer storing the specific data in the main memory means for storing, the means for buffer storing being allocated a predetermined physical address within the main memory means for storing;

a primary cache means for storing contained within the processor means and adapted to store the specific data in response to a read request executed by the processor means;

means for blocking that inhibits copying of the specific data from the buffer means for storing to the secondary cache means for storing in response to decoding the predetermined physical address during the write request to the main memory means for storing; and the means for blocking including a first logical OR circuit and a second logical OR circuit, the first logical OR circuit generating a first output based upon a particular address bit of the predetermined physical address and a first write enable signal, the second logical OR circuit generating a second output based upon the particular address bit and a second write enable signal.

2. The cache blocking mechanism of claim 1, wherein the predetermined physical address is characterized by assertion of the particular address bit during a block-mode write request.

3. The cache blocking mechanism of claim 1, wherein the specific data is transient data.

4. The cache blocking mechanism of claim 1, further comprising a means for translating a virtual address into the predetermined physical address of the means for buffer storing.

5. The cache blocking mechanism of claim 4, wherein the means for translating comprises a translation-lookaside buffer.

6. A mechanism for preventing specific data from being stored in a secondary cache of a network device, the mechanism comprising:

means for managing a designated address range of buffers in a main memory of the network device to store the specific data;

means for defining a window of virtual addresses that map to predetermined physical addresses associated with the buffers in the main memory of the network device;

means for transforming virtual addresses falling within the window into the predetermined physical addresses, each of which is characterized by assertion of a particular address bit;

means for blocking a write request directed to one of the predetermined physical addresses from propagating to the secondary cache, thereby precluding storage of the specific data in the secondary cache; and the means for blocking including a first logical OR means and a second logical OR means, the first logical OR means generating a first output based upon the particular address bit and a first write enable signal, the second logical OR means generating a second output based upon the particular address bit and a second write enable signal.

7. The mechanism of claim 6, wherein the means for transforming comprises means for asserting the particular address bit during a block-mode write transaction to the main memory.

8. The mechanism of claim 7, wherein the means for blocking comprises means for invoking write-blocking circuitry in response to the means for asserting to effectively inhibit copying of the specific data to the secondary cache.

9. A cache blocking mechanism that inhibits copying of data to a secondary cache during a write request to main memory of a network device, the mechanism comprising:

means for defining a window of virtual addresses that map to predetermined physical addresses associated with buffers in the main memory of the network device;

translation means for transforming virtual addresses falling within the window into the predetermined physical addresses, each of which is characterized by assertion of a particular address bit;

buffer means located in the main memory for storing the data, the buffer means being allocated one of the predetermined physical addresses within the main memory;

cache blocking means for inhibiting copying of the data from the buffer means to the secondary cache in response to decoding the one predetermined physical address during the write request to the main memory; and the cache blocking means for inhibiting including a first logical means for ORing and a second logical means for ORing, the first logical means for ORing generating a first output based upon the particular address bit and a first write enable signal, the second logical means for ORing generating a second output based upon the particular address bit and a second write enable signal.

10. The cache blocking mechanism of claim 9, wherein the data is transient data and wherein the translation means comprises a translation-lookaside buffer.

* * * * *